United States Patent
Liu et al.

(10) Patent No.: US 11,936,042 B2
(45) Date of Patent: Mar. 19, 2024

(54) CATHODE MATERIAL, AND ELECTROCHEMICAL DEVICE INCLUDING THE SAME

(71) Applicant: NINGDE AMPEREX TECHNOLOGY LIMITED, Ningde (CN)

(72) Inventors: Wenyuan Liu, Ningde (CN); Gang Peng, Ningde (CN); Ye Lang, Ningde (CN); Leimin Xu, Ningde (CN)

(73) Assignee: NINGDE AMPEREX TECHNOLOGY LIMITED, Ningde (CN)

(*) Notice: Subject to any disclaimer, the term of this patent is extended or adjusted under 35 U.S.C. 154(b) by 539 days.

(21) Appl. No.: 17/252,144

(22) PCT Filed: Mar. 31, 2020

(86) PCT No.: PCT/CN2020/082246
§ 371 (c)(1),
(2) Date: Dec. 14, 2020

(87) PCT Pub. No.: WO2021/012705
PCT Pub. Date: Jan. 28, 2021

(65) Prior Publication Data
US 2021/0367236 A1    Nov. 25, 2021

(30) Foreign Application Priority Data
Jul. 19, 2019   (CN) .......................... 201910654647.9

(51) Int. Cl.
*H01M 4/525*   (2010.01)
*H01M 4/36*   (2006.01)
(Continued)

(52) U.S. Cl.
CPC .......... *H01M 4/525* (2013.01); *H01M 4/364* (2013.01); *H01M 4/485* (2013.01); *H01M 4/505* (2013.01);
(Continued)

(58) Field of Classification Search
CPC ...... H01M 4/525; H01M 4/364; H01M 4/485; H01M 4/505; H01M 10/0525; H01M 2004/021
See application file for complete search history.

(56) References Cited

U.S. PATENT DOCUMENTS

2007/0059598 A1*   3/2007   Yang ..................... H01M 4/485
                                                                                       252/182.1
2016/0181611 A1      6/2016   Cho et al.
(Continued)

FOREIGN PATENT DOCUMENTS

CN    101714630 A    5/2010
CN    103296265    *  9/2013
(Continued)

OTHER PUBLICATIONS

CN 103296265MT (Year: 2013).*
(Continued)

*Primary Examiner* — Alexander Usyatinsky
(74) *Attorney, Agent, or Firm* — Juan Carlos A. Marquez; Marquez IP Law Office, PLLC (57) ABSTRACT

A cathode material includes: a plurality of first particles. Each first particle includes a secondary particle composed of a plurality of third particles, and the first particle includes a first lithium-containing transition metal oxide; and a plurality of second particles. The second particle includes a fourth particle and/or a secondary particle composed of a plurality of fourth particles, and the second particle includes a second lithium-containing transition metal oxide. The electrochemi-
(Continued)

cal device including the cathode material is significantly improved in the aspects of energy density, capacity attenuation and service life.

16 Claims, 3 Drawing Sheets

(51) Int. Cl.
 *H01M 4/48* (2010.01)
 *H01M 4/485* (2010.01)
 *H01M 4/505* (2010.01)
 *H01M 10/0525* (2010.01)
 *H01M 4/02* (2006.01)

(52) U.S. Cl.
 CPC .. *H01M 10/0525* (2013.01); *H01M 2004/021* (2013.01)

(56) References Cited

U.S. PATENT DOCUMENTS

| | | | |
|---|---|---|---|
| 2017/0155139 A1 | 6/2017 | Feng et al. | |
| 2018/0261835 A1* | 9/2018 | Ogata | H01M 4/485 |
| 2019/0074513 A1 | 3/2019 | Ham et al. | |

FOREIGN PATENT DOCUMENTS

| | | | |
|---|---|---|---|
| CN | 103296265 | A | 9/2013 |
| CN | 103531779 | A | 1/2014 |
| CN | 103840148 | A | 6/2014 |
| CN | 104282903 | A | 1/2015 |
| CN | 104979546 | A | 10/2015 |
| CN | 106099059 | * | 11/2016 |
| CN | 106099059 | A | 11/2016 |
| CN | 106848215 | A | 6/2017 |
| CN | 107437616 | A | 12/2017 |
| CN | 107978751 | A | 5/2018 |
| CN | 108352525 | A | 7/2018 |
| CN | 108878795 | A | 11/2018 |
| CN | 109962221 | A | 7/2019 |
| CN | 110416511 | A | 11/2019 |

OTHER PUBLICATIONS

CN 106099059 MT (Year: 2016).*
CN109962221MT (Year: 2019).*
PCT International Search Report dated Jun. 9, 2020 in counterpart PCT application PCT/2020/082246, 4 pages.
PCT Written Opinion dated Jun. 3, 2020 in counterpart PCT application PCT/2020/082246, 5 pages.
Chinese Notification of Grant of Patent Right and Search Report, dated Nov. 27, 2020 in counterpart Chinese application 201910654647.9, 4 pages in Chinese.
European Extended Search Report dated Dec. 18, 2023 in counterpart European application EP20817178, 6 pages in English.

* cited by examiner

CATHODE MATERIAL, AND ELECTROCHEMICAL DEVICE INCLUDING THE SAME

CROSS REFERENCE TO RELATED APPLICATIONS

The present application is a National Stage application of PCT international application: PCT/CN2020/082246, filed on 31 Mar. 2020, which claims the benefit of priority from the China Patent Application No. 201910654647.9, filed on 19 Jul. 2019, the disclosure of which is hereby incorporated by reference in its entirety.

BACKGROUND

1. Technical Field

The present application relates to the technical field of energy storage, and in particular to a cathode material, and a cathode and an electrochemical device including the same.

2. Description of the Related Art

With the rapid development of mobile electronic technology, the frequency and experience requirements of people for mobile electronic devices such as mobile phones, tablet computers, notebook computers, drones, and the like are increasing. In order to balance function and appearance, secondary batteries that provide energy and power for the mobile electronic devices need to exhibit higher energy density and smaller capacity attenuation after repeated charge and discharge processes.

At present, most secondary batteries use lithium cobalt oxide as the cathode material, but cobalt is a highly toxic, high-cost and resource-limited element, so the development of low-cobalt materials is an inexorable trend. High-nickel materials (nickel content accounting for 50% or more of all transition metal elements) have received wide attention due to their lower cobalt content and higher actual specific capacity than lithium cobalt oxide. However, high-nickel materials have high bulk density and their particles are easily broken under high compaction density, thus limiting their use in high energy density batteries. Therefore, it is necessary to develop a cathode material which can utilize a high-nickel material and is not easily broken.

SUMMARY

The present application provides a cathode material, and a cathode and an electrochemical device including the same in an attempt to solve at least one of the technical problems in the related art to some extent.

According to the embodiments of the present application, the present application provides a cathode material, the cathode material including: a plurality of first particles, wherein each first particle includes a secondary particle composed of a plurality of third particles, each third particle is a first primary particle, the plurality of first particles have an average particle diameter of 5 μm to 20 μm, the plurality of third particles have an average particle diameter of 200 nm to 700 nm, and the first particle includes a first lithium-containing transition metal oxide; and a plurality of second particles, wherein each second particle includes a fourth particle and/or a secondary particle composed of a plurality of fourth particles, the fourth particle is a second primary particle, the second particle has an average particle diameter of 3 μm to 5 μm, the fourth particle has an average particle diameter of 800 nm to 5 μm, and the second particle includes a second lithium-containing transition metal oxide.

According to embodiments of the present application, the first particle includes 150 to 2000 third particles, the second particle is a secondary particle, and the second particle includes 2 to 100 fourth particles.

According to embodiments of the present application, a ratio of the average particle diameter of the first particle to the average particle diameter of the third particle is 20 to 50.

According to embodiments of the present application, a ratio $D_s/D_p$ is 0.15 to 0.7, $D_s$ is an average particle diameter of the second particle, $D_p$ is an average particle diameter of the first particle.

According to embodiments of the present application, a mass percentage of the second particles in the cathode material is 5% to 50%.

According to embodiments of the present application, a peak intensity ratio of the (003) diffraction peak of the X-ray diffraction of the second particles to that of the first particles is 1.03 to 1.6, wherein a difference between full width at half maximum of the (003) diffraction peak of the X-ray diffraction of the first particles and that of the second particles is 0.003° to 0.008°.

According to embodiments of the present application, the first particles have a specific surface area of 0.10 m²/g to 1.50 m²/g, and the second particles have a specific surface area of 0.30 m²/g to 2.50 m²/g.

According to embodiments of the present application, the first lithium-containing transition metal oxide has the general formula of $Li_aNi_xCo_yM1_zN1_\beta O_2$, wherein 0.95≤a≤1.05, 0.5≤x<1, 0<y<0.4, 0<z<0.4, 0≤β≤0.05, and x+y+z+β=1, M1 is selected from at least one of Mn and Al, and N1 is selected from at least one of Mg, Ti, Zr, Nb, Y, Cr, V, Ge, Mo or Sr.

According to embodiments of the present application, a surface of the first lithium-containing transition metal oxide further includes a first coating element and a boron element, the first coating element is selected from at least one of Al, La, Y, Zr, Ti, Ce or F, and based on the total molar amount of the transition metal elements in the first lithium-containing transition metal oxide, a molar percentage of the first coating element is 0.1% to 0.5%, and a molar percentage of the boron element is 0.1% to 0.5%.

According to embodiments of the present application, the second lithium-containing transition metal oxide has the general formula of $Li_nNi_aCo_bM2_cN2_dO_2$, wherein 0.95≤n≤1.05, 0.5≤a<1, 0<b<0.4, 0<c<0.4, 0≤d≤0.02, and a+b+c+d=1, M2 is selected from at least one of Mn and Al, and N2 is selected from at least one of Mg, Ti, Zr, Nb, Y, Cr, V, Ge, Mo or Sr.

According to embodiments of the present application, a surface of the second lithium-containing transition metal oxide further includes a boron element, and based on the total molar amount of the transition metal elements in the second lithium-containing transition metal oxide, a molar percentage of the boron element is 0.1% to 0.5%.

According to embodiments of the present application, the present application provides a cathode, wherein the cathode includes any one of the above cathode materials.

According to embodiments of the present application, the present application provides an electrochemical device, wherein the electrochemical device includes the above cathode.

The structure of the cathode material provided by the present application is not easily broken under high compaction density, and the crystal lattice is not easily collapsed after repeated deintercalation of lithium, so the cathode material has excellent structural stability, reduces side reactions during cycling, slows down the consumption of the electrolyte, and prolongs the service life of the electrochemical device.

Additional aspects and advantages of the embodiments of the present application will be described or shown in the following description or interpreted by implementing the embodiments of the present application.

BRIEF DESCRIPTION OF THE DRAWINGS

The following will briefly illustrate the accompanying drawings necessary to describe the embodiments of the present application or the prior art so as to facilitate the description of the embodiments of the present application. Obviously, the accompanying drawings described below only show some embodiments of the present application. For those skilled in the art, the drawings of other embodiments can still be obtained according to the structures illustrated in the drawings without any creative effort.

DETAILED DESCRIPTION

The embodiments of the present application will be described in detail below. Throughout the specification, the same or similar components and components having the same or similar functions are denoted by similar reference numerals. The embodiments described herein with respect to the drawings are illustrative and graphical, and are used for providing a basic understanding of the present application. The embodiments of the present application should not be interpreted as limitations to the present application.

As used in the present application, terms "approximately", "substantially", "essentially", and "about" are used for describing and explaining a small variation. When being used in combination with an event or circumstance, the term may refer to an example in which the event or circumstance occurs precisely, and an example in which the event or circumstance occurs approximately. For example, when being used in combination with a value, the term may refer to a variation range of less than or equal to ±10% of the value, for example, less than or equal to ±5%, less than or equal to ±1%, less than or equal to ±0.5%, less than or equal to ±0.1%, or less than or equal to ±0.05%. For example, if the difference between two numerical values is less than or equal to ±10% of the average of the values (e.g., less than or equal to ±5%, less than or equal to ±1%, less than or equal to ±0.5%, less than or equal to ±0.1%, or less than or equal to ±0.05%), the two values may be considered "substantially" the same.

To facilitate description, "first," "second," "third," and the like may be used in the present application to distinguish among different components in a diagram or a combination thereof. The wordings "first," "second," "third," and the like are not intended to describe corresponding components.

In addition, sometimes, a quantity, a ratio, and another value are presented in a range format in the present application. It should be appreciated that such range formats are for convenience and conciseness, and should be flexibly understood as including not only values explicitly specified to range constraints, but also all individual values or sub-ranges within the ranges, like explicitly specifying each value and each sub-range.

In the detailed description and the claims, a list of items connected by the term "at least one of" or similar terms may mean any combination of the listed items. For example, if items A and B are listed, then the phrase "at least one of A and B" means only A; only B; or A and B. In another example, if items A, B and C are listed, then the phrase "at least one of A, B and C" means only A; or only B; only C; A and B (excluding C); A and C (excluding B); B and C (excluding A); or all of A, B and C. The item A may include a single component or multiple components. The item B may include a single component or multiple components. The item C may include a single component or multiple components.

As used herein, the singular terms "a," "an," and "the" may include plural referents unless the context clearly dictates otherwise.

The present application provides a cathode material, a cathode including the cathode material and an electrochemical device including the cathode.

Cathode Material

The present application relates to a cathode material, the cathode material including first particles formed from third particles and second particles formed from fourth particles.

Figure 1:
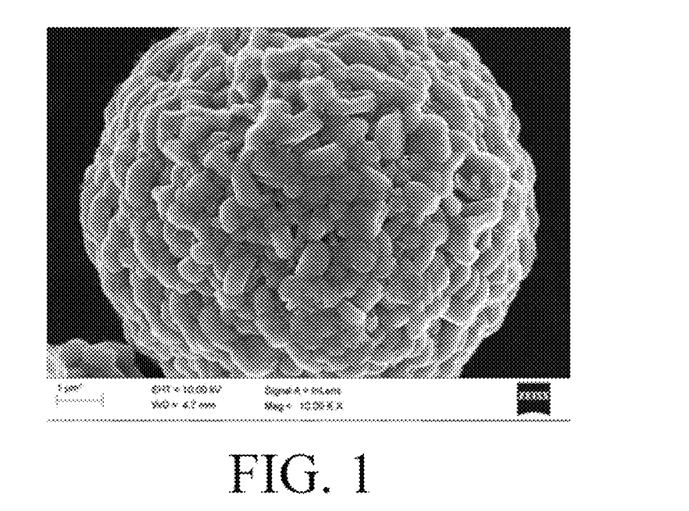
FIG. 1 is a scanning electron microscope image of a first particle of an embodiment of the present application.
Figure 2:
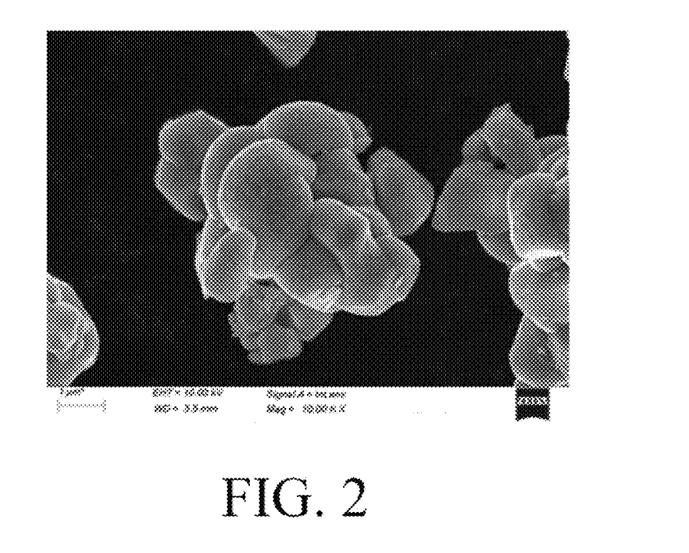
FIG. 2 is a scanning electron microscope image of a second particle of an embodiment of the present application.
Figure 3:
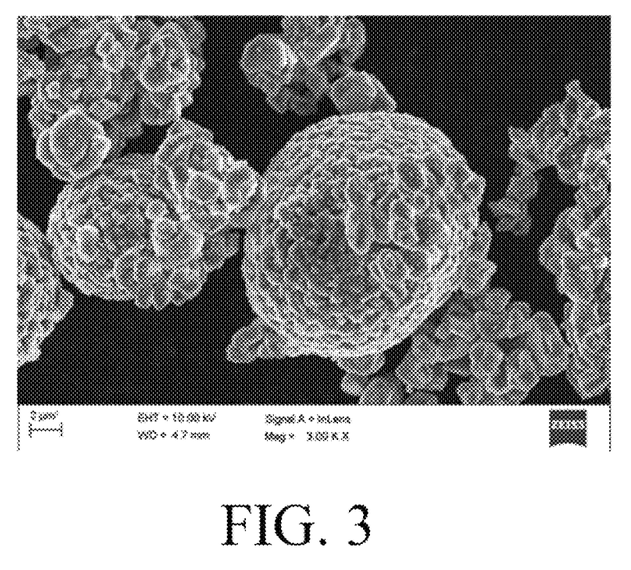
FIG. 3 is a scanning electron microscope image of a cathode material of an embodiment of the present application.

FIG. 1 and FIG. 2 are respectively scanning electron microscope images of the first particle and the second particle of an embodiment of the present application. As shown in FIG. 1, the first particle may be a spherical or ellipsoidal secondary particle formed by tightly bonding a plurality of third particles. As shown in FIG. 2, the second particle may be an irregularly shaped secondary particle stacked by a plurality of fourth particles. FIG. 3 is a scanning electron microscope image of a cathode material of an embodiment of the present application.

According to some embodiments of the present application, the average particle diameter (Dv50, the average particle diameter in the present application is Dv50) of the third particles may be about 200 nm to about 700 nm, and Dv50 represents a particle diameter for 50% of the cumulative volume from the small particle diameter side in the volume-based particle size distribution. In some embodiments, the third particles may have the average particle diameter of about 300 nm, about 400 nm, about 500 nm, about 600 nm, about 200 nm to about 500 nm, about 300 nm to about 500 nm, about 400 nm to about 600 nm, or about 500 nm to about 700 nm, etc.

According to some embodiments of the present application, the first particles may have the average particle diameter of about 5 μm to about 20 μm. In some embodiments, the first particles may have the average particle diameter of about 8 μm, about 10 μm, about 12 μm, about 15 μm, about 5 μm to about 10 μm, about 5 μm to about 15 μm, about 8 μm to about 12 μm, about 10 μm to about 20 μm or about 15 μm to about 20 μm, etc.

According to some embodiments of the present application, the first particle may include a plurality of third particles. In some embodiments, the first particle may include about 150 to about 2000 third particles. In some embodiments, the first particle may include about 200, about 500, about 800, about 1000, about 1500, about 200 to about 800, about 500 to about 800, about 500 to about 1000 or about 1000 to about 2000 third particles.

According to some embodiments of the present application, a ratio of the average particle diameter of the first particle to the average particle diameter of the third particle may be about 20 to about 50. In some embodiments, the ratio of the average particle diameter of the first particle to the average particle diameter of the third particle may be about 25, about 30, about 40, about 20 to about 30, about 20 to about 40, about 30 to about 40, or about 40 to about 50, etc.

According to some embodiments of the present application, the fourth particle may have the average particle diameter of about 800 nm to about 5 µm. In some embodiments, the fourth particle may have the average particle diameter of about 900 nm, about 1 µm, about 1.5 µm, about 2 µm, about 3 µm, about 4 µm, about 1 µm to about 2 µm, about 1 µm to about 1.5 µm, about 1 µm to about 3 µm, about 2 µm to about 5 µm or about 3 µm to about 5 µm. According to the findings of the inventors of the present application, excessively large fourth particles may cause deterioration of the kinetic performance of the cathode material, and excessively small fourth particles may cause deterioration of structural stability of the cathode material.

According to some embodiments of the present application, the second particle may have the average particle diameter of about 3 µm to about 5 µm. In some embodiments, the second particle may have the average particle diameter of about 3.5 µm, about 4 µm, about 4.5 µm, about 3 µm to about 3.5 µm, about 4 µm to about 4.5 µm, about 3 µm to about 4 µm or about 4 µm to about 5 µm.

According to some embodiments of the present application, the second particle may include a plurality of fourth particles and/or a secondary particle composed of a plurality of fourth particles. In some embodiments, the second particle may include only fourth particles. In some embodiments, the second particle may include a plurality of fourth particles and a secondary particle composed of a plurality of fourth particles. In some embodiments, the second particle may include a secondary particle composed of from about 2 to about 100 fourth particles. In some embodiments, the second particle may include a secondary particle composed of about 10, about 20, about 30, about 40, about 50, about 80, about 10 to about 20, about 10 to about 40, about 20 to about 50 or about 50 to about 80 fourth particles.

According to some embodiments of the present application, a ratio $D_s/D_p$ may be about 0.15 to about 0.7, $D_s$ is an average particle diameter of the second particle, and $D_p$ is an average particle diameter of the first particle. Excessively large $D_s/D_p$ cannot achieve the effect of reducing bulk density and compaction density, and excessively small $D_s/D_p$ may increase the specific surface area of the whole material, thereby increasing the risk of side reactions. In some embodiments, the ratio $D_s/D_p$ may be about 0.2, about 0.25, about 0.3, about 0.4, about 0.45, about 0.5, about 0.6, about 0.25 to about 0.45, about 0.2 to about 0.5, about 0.3 to about 0.7, about 0.4 to about 0.7, or about 0.5 to about 0.6, etc.

According to some embodiments of the present application, the first particles may have a specific surface area of about 0.10 m$^2$/g to about 1.50 m$^2$/g. In some embodiments, the first particles may have the specific surface area of about 0.15 m$^2$/g, about 0.3 m$^2$/g, about 0.5 m$^2$/g, about 0.6 m$^2$/g, about 1.0 m$^2$/g, about 0.15 m$^2$/g to about 0.5 m$^2$/g, about 0.3 m$^2$/g to about 0.6 m$^2$/g or about 0.5 m$^2$/g to about 1.0 m$^2$/g, etc.

According to some embodiments of the present application, the second particles may have a specific surface area of about 0.30 m$^2$/g to about 2.50 m$^2$/g. In some embodiments, the second particles may have the specific surface area of about 0.5 m$^2$/g to about 0.85 m$^2$/g, about 1.0 m$^2$/g, about 1.45 m$^2$/g, about 1.5 m$^2$/g, about 2.0 m$^2$/g, about 0.5 m$^2$/g to about 1.0 m$^2$/g, about 0.85 m$^2$/g to about 1.45 m$^2$/g, about 0.5 m$^2$/g to about 1.50 m$^2$/g or about 1.0 m$^2$/g to about 2.0 m$^2$/g, etc.

According to some embodiments of the present application, the pH value of the first particles may be about 11.5 to about 12.5. In some embodiments, the pH value of the first particles may be about 12.0 or about 11.9 to about 12.2. The pH value of the second particles may be about 11.5 to about 12.5. In some embodiments, the pH value of the second particles may be about 12.0 or about 11.9 to about 12.2.

According to some embodiments of the present application, a mass percentage of the second particles in the cathode material may be about 5% to about 50%. The second particles have large specific surface area, high direct-current resistance (DCR) and poor kinetic performance. Therefore, mixing an excessively large proportion of the second particles may reduce the kinetic performance, rate, low temperature performance and the like of the cathode material, and mixing an excessively small proportion of the second particles may affect the compaction density and structural stability of the cathode material. In some embodiments, the mass percentage of the second particles in the cathode material may be about 10%, about 15%, about 20%, about 30%, about 40%, about 10% to about 20%, about 15% to about 30%, about 20% to about 40%, about 20% to about 50% or about 30% to about 50%, etc.

According to some embodiments of the present application, in the X-ray diffraction (XRD) pattern of the cathode material, a peak intensity ratio of the (003) diffraction peak of the X-ray diffraction of the second particles to that of the first particles may be about 1.03 to about 1.6. In some embodiments, the peak intensity ratio of the (003) diffraction peak of the X-ray diffraction of the second particles to that of the first particles may be about 1.1 to about 1.3 or about 1.2 to about 1.5. A difference between full width at half maximum of the (003) diffraction peak of the X-ray diffraction of the first particles and that of the second particles is about 0.003° to about 0.008°. In some embodiments, the difference between full width at half maximum of the (003) diffraction peak of the X-ray diffraction of the first particles and that of the second particles is about 0.004° to about 0.006°, about 0.005° to about 0.008° or about 0.006° to about 0.008°. The differences of the peak intensity ratio and the difference in full width at half maximum are mainly due to different mass ratios of the first particles to the second particles in the cathode material. The greater the mass percentage of the second particles in the cathode material, the greater the peak intensity ratio of the (003) diffraction peak of the X-ray diffraction of the second particles to that of the first particles, and the greater the difference between full width at half maximum of the (003) diffraction peak of the X-ray diffraction of the first particles and that of the second particles. Furthermore, the larger the size of the primary particles, the better the crystallinity, and the sharper the (003) diffraction peak in the X-ray diffraction pattern. Therefore, the peak intensity ratio is larger, and the difference in full width at half maximum is larger.

According to some embodiments of the present application, uniformly mixing the first particles of large particle diameter and the second particles of small particle diameter may improve the degree of particle breakage of the cathode material. By uniformly mixing the first particles of large particle diameter and the second particles of small particle diameter, on the one hand, the bulk density between particles can be increased to improve the compaction density, and the degree of breakage of small particles under high compaction density can be reduced; and on the other hand, the pressure for cold pressing can be reduced, thereby improving the elongation of the current collector under high compaction density, which is beneficial to the application of the thin substrate, and the problem of breakage of the large and small particles is also further improved.

In some embodiments, the first particle and the second particle may include the same lithium-containing transition metal oxide. In some embodiments, the first particle and the second particle may include different lithium-containing transition metal oxides, for example, the first particle may include a first lithium-containing transition metal oxide, and the second particle may include a second lithium-containing transition metal oxide.

According to some embodiments of the present application, the first lithium-containing transition metal oxide may have the general formula of $Li_aNi_xCo_yM1_zN1_\beta O_2$, wherein $0.95 \leq a \leq 1.05$, $0.5 \leq x < 1$, $0 < y < 0.4$, $0 < z < 0.4$, $0 \leq \beta \leq 0.05$, and $x+y+z+\beta=1$, M1 is selected from at least one of Mn or Al, and N1 is selected from at least one of Mg, Ti, Zr, Nb, Y, Cr, V, Ge, Mo or Sr.

In some embodiments, a surface of the first lithium-containing transition metal oxide may further include a first coating element and a boron element, and the first coating element is selected from at least one of Al, La, Y, Zr, Ti, Ce or F. Based on the total molar amount of the transition metal elements in the first lithium-containing transition metal oxide, a molar percentage of the first coating element may be about 0.1% to about 0.5%, about 0.2%, about 0.3% or about 0.4%, and the molar percentage of the boron element may be about 0.1% to about 0.5%, about 0.2%, about 0.3% or about 0.4%.

According to some embodiments of the present application, the second lithium-containing transition metal oxide may have the general formula of $Li_nNi_aCo_bM2_cN2_dO_2$, wherein $0.95 \leq n \leq 1.05$, $0.5 \leq a < 1$, $0 < b < 0.4$, $0 < c < 0.4$, $0 \leq d \leq 0.02$, and $a+b+c+d=1$, M2 is selected from at least one of Mn and Al, and N2 is selected from at least one of Mg, Ti, Zr, Nb, Y, Cr, V, Ge, Mo or Sr.

In some embodiments, a surface of the second lithium-containing transition metal oxide may further include a boron element. Based on the total molar amount of the transition metal elements in the second lithium-containing transition metal oxide, a molar percentage of the boron element is about 0.1% to about 0.5%, about 0.2%, about 0.3% or about 0.4%.

In some embodiments, in order to increase the discharge specific capacity and the initial efficiency of the electrochemical device including as much cathode material as possible, the doping amount of the second particles and the amount of elements which coat the surface may be relatively low, for example, the coating amount of the second particles may be about 0.1% to about 0.2%. According to the embodiments, the erosion of the cathode material by the water washing step can be alleviated by coating the first particles and the second particles, so that the lithium ion battery including the cathode material can have high energy density and long cycle performance.

Figure 4:
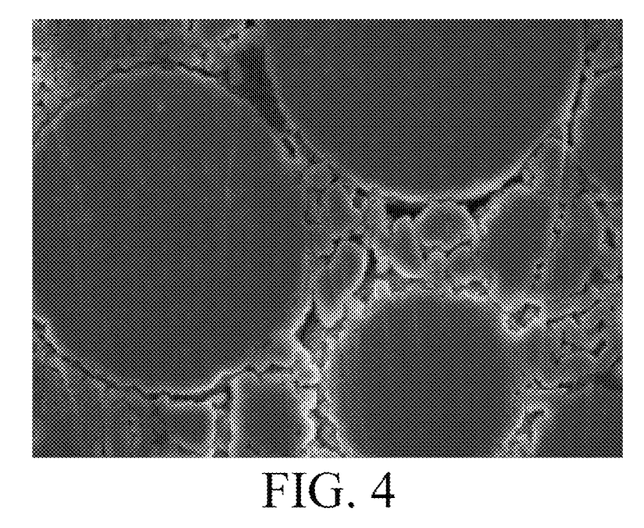
FIG. 4 is a scanning electron microscope image of a cathode material of an embodiment of the present application under high compaction density.

In some embodiments, the first particle may be a particle formed from a plurality of the third particles that are polycrystalline, and the second particle may be a particle formed from one or more fourth particles that are monocrystalline. The crystallinity of the second particle may be higher than the crystallinity of the first particle, and thus the second particle has a higher peak intensity and a smaller full width at half maximum. Moreover, since the crystallinity of the second particles is high, the structure of the particles not easily broken under high compaction density and the crystal lattice is not easily collapsed after repeated deintercalation of lithium, so the cathode material including the second particles can maintain structural stability, reduce side reactions during cycling, slow down the consumption of the electrolyte, and prolong the service life of the lithium ion battery while satisfying high compaction density. As shown in FIG. 4, the cathode material formed from the first particles and the second particles hardly undergoes particle breakage under high compaction density.

Preparation Method of the Cathode Material

According to some embodiments of the present application, the cathode material may be prepared by forming the first particles, forming the second particles, and uniformly mixing the first particles and the second particles.

Forming the first particles: A first precursor, a lithium (Li) source and a first doping element are uniformly mixed according to the stoichiometric ratio of the first lithium-containing transition metal oxide and then dried, and subjected to primary calcination at about 770° C. to about 830° C. for about 14 h to about 18 h to form the first particles composed of the third particles.

Forming the second particles: A second precursor, a lithium source and a second doping element are uniformly mixed according to the stoichiometric ratio of the second lithium-containing transition metal oxide and then dried, and subjected to primary calcination at about 820° C. to about 880° C. for about 14 h to about 18 h to form the second particles composed of the fourth particles.

Uniformly mixing the first particles and the second particles: The formed first particles and second particles are uniformly mixed according to a certain mass percentage to form the cathode material.

In some embodiments, the first precursor and the second precursor may each be a precursor of an NCM (nickel cobalt manganese) material or an NCA (nickel cobalt aluminum) material, and the first doping element and the second doping element may each be selected from at least one of Mg, Ti, Zr, Nb, Y, Cr, V, Ge, Mo or Sr.

In some embodiments, the first particles and the second particles may also be coated respectively to alleviate the erosion of the cathode material by the water washing step. The first particles formed by the primary calcination and the first coating element are uniformly mixed, subjected to secondary calcination at about 570° C. to 630° C. for about 4 h to about 8 h for pre-coating, and then the pre-coated particles and boron are uniformly mixed, and sintered at 370° C. to 430° C. for about 2 h to about 6 h to coat the boron, thereby finally forming the coated first particles. According to the embodiments, the first coating element may be selected from at least one of Al, La, Y, Zr, Ti, Ce or F. The second particles formed by the primary calcination and boron are uniformly mixed, and sintered at 370° C. to 430° C. for about 2 h to about 6 h to coat the boron, thereby finally forming the coated second particles. The above coated first particles and second particles are uniformly mixed to form an erosion-resistant cathode material, so that the lithium ion battery including the cathode material can have high energy density and long cycle performance.

Cathode and Electrochemical Device

The present application further provides a cathode, the cathode including a cathode current collector (for example, an Al current collector) and the above cathode material.

The present application further provides an electrochemical device. The electrochemical device may be any device that undergoes an electrochemical reaction, and specific examples thereof include all kinds of primary batteries, secondary batteries, fuel cells, solar cells or capacitors. In particular, the electrochemical device is a lithium secondary battery including a lithium metal secondary battery, a lithium ion secondary battery, a lithium polymer secondary battery or a lithium ion polymer secondary battery. The electrochemical device includes the above cathode, an anode, and a separator disposed between the cathode and the anode.

The electrochemical device may be a lithium ion battery. The lithium ion battery includes a cathode containing a cathode material, an anode containing an anode material, an electrolyte, and a separator located between the cathode and the anode, wherein the cathode material is the cathode material described above. The cathode current collector may be aluminum foil or nickel foil, and the anode current collector may be copper foil or nickel foil.

The anode material is capable of absorbing and releasing lithium (hereinafter, sometimes referred to as "an anode material capable of absorbing/releasing lithium"). Examples of the anode material capable of absorbing/releasing lithium can include a carbon material, a metal compound, an oxide, a sulfide, or a nitride of lithium including $LiN_3$, a lithium metal, a metal forming an alloy with lithium, and a polymer material.

Examples of the carbon material can include low graphitized carbon, easily graphitized carbon, artificial graphite, natural graphite, mesocarbon microbeads, soft carbon, hard carbon, pyrolytic carbon, coke, vitreous carbon, an organic polymer compound sintered body, carbon fibers and active carbon. The coke can include pitch coke, needle coke and petroleum coke. The organic polymer compound sintered body refers to a material obtained by calcining a polymer material such as phenol plastic or furan resin at an appropriate temperature to carbonize the polymer material, and some of these materials are classified into low graphitized carbon or easily graphitized carbon. The polymer material can include polyacetylene and polypyrrole.

Among these anode materials capable of absorbing/releasing lithium, materials of which the charging and discharging voltages are close to the charging and discharging voltages of the lithium metal are selected. This is because if the charging and discharging voltages of the anode material are lower, the lithium ion battery can more easily have higher energy density. The anode material can be selected from carbon materials because their crystal structures are only slightly changed upon charging and discharging, so good cycle characteristics and large charging and discharging capacities can be obtained. For example, graphite is selected because it can give a large electrochemical equivalent and a high energy density.

Further, anode material capable of absorbing/releasing lithium can include elementary lithium metals, metal elements and semi-metal elements capable of forming alloys together with lithium, alloys and compounds thereof, etc. They can be used together with a carbon material to obtain good cycle characteristics as well as high energy density. In addition to the alloys including two or more metal elements, the alloys used here also include alloys including one or more metal elements and one or more semi-metal elements. The alloys can be in the form of a solid solution, a eutectic crystal, an intermetallic compound, and a mixture thereof.

Examples of the metal element and the semimetal element may comprise tin (Sn), lead (Pb), aluminum (Al), indium (In), silicon (Si), zinc (Zn), antimony (Sb), bismuth (Bi), cadmium (Cd), magnesium (Mg), boron (B), gallium (Ga), germanium (Ge), arsenic (As), silver (Ag), zirconium (Zr), ytterbium (Y) or hafnium (Hf). Examples of the above alloys and compounds may comprise a material having the chemical formula: $Ma_sMb_tLi_u$, and a material having a chemical formula: $Ma_pMc_qMd_r$. In these chemical formulae, Ma denotes at least one of a metal element and a semimetal element capable of forming an alloy with lithium; Mb denotes at least one of the metal element and the semimetal element other than lithium and Ma; Mc denotes at least one of the non-metallic elements; Md represents at least one of the metal element and the semimetal element other than Ma; and s, t, u, p, q, and r satisfy s>0, t≥0, u≥0, p>0, q>0, and r≥0.

Further, an inorganic compound not including lithium, such as $MnO_2$, $V_2O_5$, $V_6O_{13}$, NiS or MoS, can be used in the anode.

The separator of the lithium ion battery includes, but is not limited to, at least one selected from polyethylene, polypropylene, polyethylene terephthalate, polyimide and aramid. For example, the polyethylene includes at least one component selected from the group consisting of high-density polyethylene, low-density polyethylene and ultra-high molecular weight polyethylene. In particular, the polyethylene and polypropylene have a good effect on preventing short circuits, and can improve the stability of the battery by means of the shutdown effect.

The separator surface may further include a porous layer. The porous layer is disposed on at least one surface of the separator. The porous layer includes one or two of inorganic particles and a binder. The inorganic particles are any one or combination of more than one selected from alumina ($Al_2O_3$), silicon oxide ($SiO_2$), magnesium oxide (MgO), titanium oxide ($TiO_2$), hafnium oxide ($HfO_2$), tin oxide ($SnO_2$), cerium oxide ($CeO_2$), nickel oxide (NiO), zinc oxide (ZnO), calcium oxide (CaO), zirconium dioxide ($ZrO_2$), yttrium oxide ($Y_2O_3$), silicon carbide (SiC), boehmite, aluminum hydroxide, magnesium hydroxide, calcium hydroxide, or barium sulfate. The binder is any one or combination of more than one selected from polyvinylidene fluoride, vinylidene fluoride-hexafluoropropylene copolymer, polyamide, polyacrylonitrile, polyacrylate ester, polyacrylic acid, polyacrylate salt, sodium carboxymethylcellulose, polyvinylpyrrolidone, polyvinyl ether, polymethyl methacrylate, polytetrafluoroethylene, or polyhexafluoropropylene.

The porous layer can improve heat resistance, oxidation resistance and electrolyte wettability of the separator, and enhance the binding property between the separator and the cathode or anode.

The above lithium ion battery further includes an electrolyte, the electrolyte can be one or more of a gel electrolyte, a solid electrolyte and an electrolytic solution, and the electrolytic solution includes a lithium salt and a non-aqueous solvent.

The lithium salt is one or more selected from the group consisting of $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiSiF_6$, LiBOB or lithium difluoroborate. For example, $LiPF_6$ is selected as the lithium salt due to its high ionic conductivity and improved cycle characteristics.

The non-aqueous solvent can be a carbonate compound, a carboxylate compound, an ether compound, other organic solvent or a combination thereof.

The carbonate compound can be a chain carbonate compound, a cyclic carbonate compound, a fluorocarbonate compound or a combination thereof.

Examples of the chain carbonate compound include diethyl carbonate (DEC), dimethyl carbonate (DMC), dipropyl carbonate (DPC), methyl propyl carbonate (MPC), ethyl propyl carbonate (EPC), methyl ethyl carbonate (MEC), and a combination thereof. Examples of the cyclic carbonate compound include ethylene carbonate (EC), propylene carbonate (PC), butylene carbonate (BC), vinyl ethylene carbonate (VEC) or a combination thereof. Examples of the fluorocarbonate compound comprise fluoroethylene carbonate (FEC), 1,2-difluoroethylene carbonate, 1,1-difluoroethylene carbonate, 1,1,2-trifluoroethylene carbonate, 1,1,2,2-tetrafluoroethylene carbonate, 1-fluoro-2-methylethylene carbonate, 1-fluoro-1-methylethylene carbonate, 1,2-difluoro-1-methylethylene carbonate, 1,1,2-trifluoro-2-methylethylene carbonate, trifluoromethylethylene carbonate or a combination thereof.

Examples of the carboxylate compound may be methyl acetate, ethyl acetate, n-propyl acetate, tert-butyl acetate, methyl propionate, ethyl propionate, propyl propionate, γ-butyrolactone, decalactone, valerolactone, mevalonolactone, caprolactone, methyl formate or a combination thereof.

Examples of the ether compound may be dibutyl ether, tetraethylene glycol dimethyl ether, diglyme, 1,2-dimethoxyethane, 1,2-diethoxyethane, ethoxymethoxyethane, 2-methyltetrahydrofuran, tetrahydrofuran or a combination thereof.

Examples of the other organic solvent may be dimethyl sulfoxide, 1,2-dioxolane, sulfolane, methyl sulfolane, 1,3-dimethyl-2-imidazolidinone, N-methyl-2-pyrrolidone, formamide, dimethylformamide, acetonitrile, trimethyl phosphate, triethyl phosphate, trioctyl phosphate, phosphate or a combination thereof.

Hereinafter, a lithium ion battery is taken as an example, and combined with specific preparation methods and tests on the prepared lithium ion battery to explain the preparation and performance of the lithium ion battery of the present application. However, those skilled in the art will appreciate that the preparation methods described in the present application are merely examples, and that any other suitable preparation method is within the scope of the present application.

EXAMPLES

Hereinafter, the present application will be specifically described by way of examples and comparative examples; however, the present application is not limited thereto as long as they do not deviate from the spirit of the present application.

Example 1

A first NCM precursor having the Dv50 of 9 μm, lithium hydroxide (LiOH) and nano magnesium oxide (MgO) were prepared according to the stoichiometric ratio of $LiNi_{0.84}Co_{0.08}Mn_{0.05}Mg_{0.03}O_2$ (first transition metal oxide), and uniformly mixed and dried, and after drying, the mixture was subjected to primary calcination at 800° C. for 16 h to obtain first particles (Dv50 of 11.5 μm) composed of third particles (Dv50 of 0.6 μm). Then, the first particles and aluminum hydroxide (Al(OH)$_3$) were uniformly mixed, and subjected to secondary calcination at 600° C. for 6 h for pre-coating, the molar percentage of aluminum being 0.3%. Subsequently, the pre-coated first particles and boric acid (H$_3$BO3) were uniformly mixed, and sintered at 400° C. for 4 h for the boron coating, the molar percentage of boron being 0.3%, thereby finally obtaining the coated first particles.

A second NCM precursor having the Dv50 of 2.5 μm, lithium hydroxide and nano magnesium oxide were prepared according to the stoichiometric ratio of $LiNi_{0.85}Co_{0.08}Mn_{0.05}Mg_{0.02}O_2$ (second transition metal oxide), and uniformly mixed and dried, and after drying, the mixture was subjected to primary calcination at 850° C. for 16 h to obtain second particles (Dv50 of 4.0 μm) composed of fourth particles (Dv50 of 1.5 μm). Then, the second particles and boric acid were uniformly mixed, and sintered at 400° C. for 4 h for boron coating, the molar percentage of the boron element being 0.2%, thereby finally obtaining the coated second particles.

The coated first particles and the coated second particles were uniformly mixed according to a mass ratio of 8:2 to form a cathode material.

The specific surface areas of the first particles and the second particles were respectively measured, and the formed cathode material was subjected to X-ray diffraction. The specific data is shown in Table 2 below.

The prepared cathode material, acetylene black as a conductive agent and polyvinylidene fluoride (PVDF) as an adhesive were sufficiently stirred and uniformly mixed in a mass ratio of about 94:3:3 in an N-methylpyrrolidone solvent system, coated a cathode current collector Al foil, and was dried, cold-pressed and slit to obtain a cathode.

Using copper foil as an anode current collector, a layer of graphite slurry, composed of 97.7 wt % of artificial graphite, 1.3 wt % of sodium carboxymethyl cellulose (CMC) and 1.0 wt % of styrene-butadiene rubber (SBR), was used for uniformly coating the surface of the copper foil, dried at 85° C., subjected to cold pressing, cutting and slitting, and dried under vacuum conditions at 85° C. for 4 h to obtain an anode.

A solution prepared from a lithium salt LiPF$_6$ and a nonaqueous organic solvent (ethylene carbonate (EC):diethyl carbonate (DEC):polypropylene carbonate (PC):propyl propionate (PP):vinylene carbonate (VC)=20:30:20:28:2, mass ratio) in a mass ratio of 8:92 was used as an electrolytic solution of the lithium-ion battery.

The cathode and the anode were wound, and separated by a polyethylene separator (having the thickness of 9 μm), thereby preparing a wound electrode assembly. After the electrode assembly was subjected to top side sealing, coding, vacuum drying, electrolytic solution injection and high-temperature standing, formation and capacity test were performed to obtain the finished lithium-ion battery.

Example 2 to Example 4

The preparation methods of Example 2 to Example 4 were the same as that of Example 1, except that the mass ratios of the first particles to the second particles were different. The specific mass ratios are shown in Table 1 below.

Example 5 to Example 8

The preparation method of Example 5 was the same as that of Example 1, except that the second NCM precursor had the Dv50 of 0.8 μm and the second particles had the Dv50 of 1.7 μm in Example 5.

The preparation method of Example 6 was the same as that of Example 1, except that the second NCM precursor had the Dv50 of 1.5 μm and the second particles had the Dv50 of 3.0 μm in Example 6.

The preparation method of Example 7 was the same as that of Example 1, except that the second NCM precursor had the Dv50 of 3.5 μm and the second particles had the Dv50 of 5.0 μm in Example 7.

The preparation method of Example 8 was the same as that of Example 1, except that the second NCM precursor had the Dv50 of 5.7 μm and the second particles had the Dv50 of 8.0 μm in Example 8.

Example 9 and Example 10

The preparation method of Example 9 was the same as that of Example 1, except that the primary calcination temperature for forming the second particles was 830° C. and the fourth particles had the Dv50 of 0.8 μm.

The preparation method of Example 10 was the same as that of Example 1, except that the primary calcination temperature for forming the second particles was 870° C. and the fourth particles had the Dv50 of 2.5 μm.

Example 11 to Example 14

The preparation method of Example 11 was the same as that of Example 1, except that the first NCM precursor had the Dv50 of 6 μm and the first particles had the Dv50 of 8.0 μm.

The preparation method of Example 12 was the same as that of Example 1, except that the first NCM precursor had the Dv50 of 11.0 μm and the first particles had the Dv50 of 13.5 μm.

The preparation method of Example 13 was the same as that of Example 1, except that the first NCM precursor had the Dv50 of 16.0 μm and the first particles had the Dv50 of 20.0 μm.

The preparation method of Example 14 was the same as that of Example 1, except that the first NCM precursor had the Dv50 of 16.0 μm, the third particles had the Dv50 of 0.4 μm, and the first particles had the Dv50 of 20.0 μm.

Example 15 to Example 17

The preparation method of Example 15 was the same as that of Example 12, except that only the first particles were coated, and the coated first particles and the second particles subjected to primary calcination were uniformly mixed to obtain the final cathode material.

The preparation method of Example 16 was the same as that of Example 12, except that the first particles were not subjected to pre-coating (i.e., aluminum coating), but the first particles subjected to the primary calcination were directly subjected to boron coating, and then the coated first particles and the coated second particles were uniformly mixed to obtain the final cathode material.

The preparation method of Example 17 was the same as that of Example 12, except that the first particles were not subjected to boron coating, and the pre-coated first particles and the coated second particles were uniformly mixed to obtain the final cathode material.

The other data of Example 1 to Example 17 are shown in Table 1 below.

Comparative Example 1 and Comparative Example 2

In Comparative Example 1, the first particles were prepared according to the method of Example 1, and the cathode material included only the first particles.

In Comparative Example 2, the second particles were prepared according to the method of Example 1, and the cathode material included only the second particles.

Battery Performance Test Methods and Results

The lithium ion batteries prepared in Example 1 to Example 17, Comparative Example 1 and Comparative Example 2 were subjected to a discharge specific capacity test, an initial efficiency test and a cycle test, and the obtained test results are shown in Table 1.

Discharge specific capacity test: The lithium ion battery was charged at a rate of 0.5 C to 4.25 V, charged at a constant voltage to 0.05 C, and then discharged at a rate of 0.5 C to 2.8 V, thereby obtaining an initial charge capacity and an initial discharge capacity. Discharge specific capacity=initial discharge capacity (mAh)/cathode material mass (g) of cathode, and initial efficiency=initial discharge capacity (mAh)/initial charge capacity (mAh).

Cycle test: The lithium ion battery that completed the discharge specific capacity test was charged at 25° C. at a rate of 1.5 C to 4.25 V, charged at a constant voltage to 0.05 C, and then discharged at a rate of 4 C to 2.8 V. This cycle was repeated 500 times, and then the capacity of the lithium ion battery after 500 cycles was calculated. Capacity retention rate=discharge capacity (mAh) at $500^{th}$ cycle/initial discharge capacity (mAh).

TABLE 1

| | Average particle diameter of third particles (μm) | Average particle diameter $D_p$ of first particles (μm) | Average particle diameter of fourth particles (μm) | Average particle diameter $D_s$ of second particles (μm) | Mass ratio of first particles to second particles | Discharge specific capacity mAh/g | Initial efficiency | Capacity retention rate |
|---|---|---|---|---|---|---|---|---|
| Example 1 | 0.6 | 11.5 | 1.5 | 4.0 | 8:2 | 209.5 | 91.5% | 88% |
| Example 2 | 0.6 | 11.5 | 1.5 | 4.0 | 9.5:0.5 | 210.1 | 92.0% | 86% |
| Example 3 | 0.6 | 11.5 | 1.5 | 4.0 | 7:3 | 209.0 | 91.0% | 91% |
| Example 4 | 0.6 | 11.5 | 1.5 | 4.0 | 5:5 | 208.1 | 90.1% | 93% |
| Example 5 | 0.6 | 11.5 | 1.5 | 1.7 | 8:2 | 212.1 | 92.7% | 82% |
| Example 6 | 0.6 | 11.5 | 1.5 | 3.0 | 8:2 | 210.5 | 92.0% | 85% |
| Example 7 | 0.6 | 11.5 | 1.5 | 5.0 | 8:2 | 207.2 | 90.0% | 92% |
| Example 8 | 0.6 | 11.5 | 1.5 | 8.0 | 8:2 | 205.8 | 89.1% | 95% |
| Example 9 | 0.6 | 11.5 | 0.8 | 4.0 | 8:2 | 210.2 | 91.8% | 87% |
| Example 10 | 0.6 | 11.5 | 2.5 | 4.0 | 8:2 | 208.4 | 90.3% | 92% |
| Example 11 | 0.6 | 8.0 | 1.5 | 4.0 | 8:2 | 210.3 | 92.2% | 87% |
| Example 12 | 0.6 | 13.5 | 1.5 | 4.0 | 8:2 | 209.1 | 91.2% | 91% |
| Example 13 | 0.6 | 20.0 | 1.5 | 4.0 | 8:2 | 208.3 | 90.3% | 93% |
| Example 14 | 0.4 | 20.0 | 1.5 | 4.0 | 8:2 | 208.7 | 90.9% | 92% |
| Example 15 | 0.6 | 13.5 | 1.5 | 4.0 | 8:2 | 210.4 | 91.6% | 86% |

TABLE 1-continued

|  | Average particle diameter of third particles (μm) | Average particle diameter $D_p$ of first particles (μm) | Average particle diameter of fourth particles (μm) | Average particle diameter $D_s$ of second particles (μm) | Mass ratio of first particles to second particles | Discharge specific capacity mAh/g | Initial efficiency | Capacity retention rate |
|---|---|---|---|---|---|---|---|---|
| Example 16 | 0.6 | 13.5 | 1.5 | 4.0 | 8:2 | 209.6 | 91.2% | 86% |
| Example 17 | 0.6 | 13.5 | 1.5 | 4.0 | 8:2 | 209.6 | 91.3% | 85% |
| Comparative Example 1 | 0.6 | 11.5 | — | — | — | 210.9 | 92.1% | 80% |
| Comparative Example 2 | — | — | 1.5 | 4.0 | — | 205.4 | 87.2% | 91% |

TABLE 2

|  | Specific surface area of first particles (m²/g) | Specific surface area of second particles (m²/g) | Peak intensity ratio of (003) diffraction peak of X-ray diffraction of second particles to that of first particles | Difference between full width at half maximum of (003) diffraction peak of X-ray diffraction of first particles and that of second particles |
|---|---|---|---|---|
| Example 1 | 0.600 | 0.800 | 1.3 | 0.005° |
| Example 2 | 0.600 | 0.800 | 1.3 | 0.005° |
| Example 3 | 0.600 | 0.800 | 1.3 | 0.005° |
| Example 4 | 0.600 | 0.800 | 1.3 | 0.005° |
| Example 5 | 0.600 | 0.911 | 1.3 | 0.005° |
| Example 6 | 0.600 | 0.850 | 1.3 | 0.005° |
| Example 7 | 0.600 | 0.750 | 1.3 | 0.005° |
| Example 8 | 0.600 | 0.590 | 1.3 | 0.005° |
| Example 9 | 0.600 | 0.800 | 1.2 | 0.004° |
| Example 10 | 0.600 | 0.800 | 1.4 | 0.006° |
| Example 11 | 0.650 | 0.800 | 1.3 | 0.005° |
| Example 12 | 0.550 | 0.800 | 1.3 | 0.005° |
| Example 13 | 0.390 | 0.800 | 1.3 | 0.005° |
| Example 14 | 0.395 | 0.800 | 1.4 | 0.006° |
| Example 15 | 0.550 | 0.800 | 1.3 | 0.005° |
| Example 16 | 0.550 | 0.800 | 1.3 | 0.005° |
| Example 17 | 0.550 | 0.800 | 1.3 | 0.005° |

It can be seen from Table 1 that the cathode material of Comparative Example 1 includes only the first particles, and thus the cathode material has poor structural stability and small compaction density, so that the lithium ion battery has a low capacity retention rate. The cathode material of Comparative Example 2 includes only the second particles, and the cathode material has poor kinetic performance, a low rate and low electrical conductivity, so that the lithium ion battery has low discharge specific capacity and initial efficiency. Compared with Comparative Example 1 and Comparative Example 2, Example 1 to Example 4 can maintain the capacity retention rate, discharge specific capacity and initial efficiency of the lithium ion battery at higher levels.

It can be seen from Example 5 to Example 14 that when the mass percentage of the second particles in the cathode material is 20%, the cathode material can obtain good discharge specific capacity, initial efficiency and cycle efficiency when the $D_s/D_p$ is in the range of about 0.15 to about 0.70.

Compared with Example 15 to Example 17, the capacity retention rate of Example 12 is higher. This is because both the first particles and the second particles of Example 12 were subjected to a complete coating step, thereby forming an erosion-resistant cathode material, so that the lithium ion battery including the cathode material can have high energy density and long cycle performance.

Throughout the specification, references to "embodiment," "part of embodiments," "one embodiment," "another example," "example," "specific example" or "part of examples" mean that at least one embodiment or example of the present application includes specific features, structures, materials or characteristics described in the embodiment or example. Thus, some descriptions appearing throughout the specification recite such expressions as "in some embodiments," "in an embodiment," "in one embodiment," "in another example," "in one example," "in a specific example" or "an example," which does not necessarily refer to the same embodiment or example in the present application. Furthermore, the specific features, structures, materials or characteristics in the descriptions can be combined in any suitable manner in one or more embodiments or examples.

Although the illustrative embodiments have been shown and described, it should be understood by those skilled in the art that the above embodiments cannot be interpreted as limitations to the present application, and the embodiments can be changed, substituted and modified without departing from the spirit, principle and scope of the present application.

What is claimed is:
1. A cathode material, comprising:
   a plurality of first particles, wherein each first particle comprises a secondary particle composed of a plurality of third particles, each third particle is a first primary particle, the plurality of first particles have an average particle diameter of 8 μm to 20 μm, the plurality of third particles have an average particle diameter of 200 nm to 700 nm, and the first particle comprises a first lithium-containing transition metal oxide; and a plurality of second particles, wherein each second particle comprises a fourth particle and/or a secondary particle composed of a plurality of fourth particles, the fourth particle is a second primary particle, the second particle has an average particle diameter of 3 μm to 5 μm, the fourth particle has an average particle diameter of 800 nm to 5 μm, and the second particle comprises a second lithium-containing transition metal oxide, wherein a ratio of the average particle diameter of the plurality of first particles to the average particle diameter of the plurality of third particles is 20 to 50; and wherein a ratio $D_s/D_p$ is 0.15 to 0.7, $D_s$ is an average particle diameter of the plurality of second particles, and $D_p$ is an average particle diameter of the plurality of first particles.

2. The cathode material according to claim 1, wherein the first particle comprises 150 to 2000 third particles, the second particle is a secondary particle, and the second particle comprises 2 to 100 fourth particles.

3. The cathode material according to claim 1, wherein a mass percentage of the second particles in the cathode material is 5% to 50%.

4. The cathode material according to claim 1, wherein a peak intensity ratio of the (003) diffraction peak of the X-ray diffraction of the second particles to that of the first particles is 1.03 to 1.6, a difference between full width at half maximum of the (003) diffraction peak of the X-ray diffraction of the first particles and that of the second particles being 0.003° to 0.008°.

5. The cathode material according to claim 1, wherein the first particles have a specific surface area of 0.10 m$^2$/g to 1.50 m$^2$/g, and the second particles have a specific surface area of 0.30 m$^2$/g to 2.50 m$^2$/g.

6. The cathode material according to claim 1, wherein the first lithium-containing transition metal oxide has the general formula of $Li_\alpha Ni_x Co_y M1_z N1_\beta O_2$, wherein $0.95 \leq \alpha \leq 1.05$, $0.5 \leq x < 1$, $0 < y < 0.4$, $0 < z < 0.4$, $0 \leq \beta \leq 0.05$, and $x+y+z+\beta=1$, M1 is selected from at least one of Mn or Al, and N1 is selected from at least one of Mg, Ti, Zr, Nb, Y, Cr, V, Ge, Mo or Sr.

7. The cathode material according to claim 6, wherein a surface of the first lithium-containing transition metal oxide further comprises a first coating element and a boron element, the first coating element is selected from at least one of Al, La, Y, Zr, Ti, Ce or F, and based on the total molar amount of the transition metal elements in the first lithium-containing transition metal oxide, a molar percentage of the first coating element is 0.1% to 0.5%, and a molar percentage of the boron element is 0.1% to 0.5%.

8. The cathode material according to claim 1, wherein the second lithium-containing transition metal oxide has the general formula of $Li_n Ni_a Co_b M2_c N2_d O_2$, wherein $0.95 \leq a \leq 1.05$, $0.5 \leq a < 1$, $0 < b < 0.4$, $0 < c < 0.4$, $0 \leq d \leq 0.02$ and $a+b+c+d=1$, M2 is selected from at least one of Mn or Al, and N2 is selected from at least one of Mg, Ti, Zr, Nb, Y, Cr, V, Ge, Mo or Sr.

9. The cathode material according to claim 8, wherein a surface of the second lithium-containing transition metal oxide further comprises a boron element, and based on the total molar amount of the transition metal elements in the second lithium-containing transition metal oxide, a molar percentage of the boron element is 0.1% to 0.5%.

10. An electrochemical device, comprising a cathode, wherein the cathode comprises a cathode material, wherein the cathode material comprises:

a plurality of first particles, wherein each first particle comprises a secondary particle composed of a plurality of third particles, each third particle is a first primary particle, the plurality of first particles have an average particle diameter of 8 μm to 20 μm, the plurality of third particles have an average particle diameter of 200 nm to 700 nm, and the first particle comprises a first lithium-containing transition metal oxide; and a plurality of second particles, wherein each second particle comprises a fourth particles and/or a secondary particle composed of a plurality of fourth particles, the fourth particle is a second primary particle, the second particle has an average particle diameter of 3 μm to 5 μm, the fourth particle has an average particle diameter of 800 nm to 5 μm, and the second particle comprises a second lithium-containing transition metal oxide, wherein a ratio of the average particle diameter of the plurality of first particles to the average particle diameter of the plurality of third particles is 20 to 50; and wherein a ratio $D_s/D_p$ is 0.15 to 0.7, $D_s$ is an average particle diameter of the plurality of second particles, and $D_p$ is an average particle diameter of the plurality of first particles.

11. The electrochemical device according to claim 10, wherein the first particle comprises 150 to 2000 third particles, the second particle is a secondary particle, and the second particle comprises 2 to 100 fourth particles.

12. The electrochemical device according to claim 10, wherein a mass percentage of the second particles in the cathode material is 5% to 50%.

13. The electrochemical device according to claim 10, wherein a peak intensity ratio of the (003) diffraction peak of the X-ray diffraction of the second particles to that of the first particles is 1.03 to 1.6, a difference between full width at half maximum of the (003) diffraction peak of the X-ray diffraction of the first particles and that of the second particles being 0.003° to 0.008°.

14. The electrochemical device according to claim 10, wherein the first particles have a specific surface area of 0.10 m$^2$/g to 1.50 m$^2$/g, and the second particles have a specific surface area of 0.30 m$^2$/g to 2.50 m$^2$/g.

15. The electrochemical device according to claim 10, wherein the first lithium-containing transition metal oxide has the general formula of $Li_\alpha Ni_x Co_y M1_z N1_\beta O_2$, wherein $0.95 \leq \alpha \leq 1.05$, $0.5 \leq x < 1$, $0 < y < 0.4$, $0 < z < 0.4$, $0 \beta \leq 0.05$, and $x+y+z+\beta=1$, M1 is selected from at least one of Mn or Al, and N1 is selected from at least one of Mg, Ti, Zr, Nb, Y, Cr, V, Ge, Mo or Sr, a surface of the first lithium-containing transition metal oxide further comprises a first coating element and a boron element, the first coating element is selected from at least one of Al, La, Y, Zr, Ti, Ce or F, and based on the total molar amount of the transition metal elements in the first lithium-containing transition metal oxide, a molar percentage of the first coating element is 0.1% to 0.5%, and a molar percentage of the boron element is 0.1% to 0.5%.

16. The electrochemical device according to claim 15, wherein the second lithium-containing transition metal oxide has the general formula of $Li_n Ni_a Co_b M2_c N2_d O_2$, wherein $0.95 \leq n \leq 1.05$, $0.5 \leq a < 1$, $0 < b < 0.4$, $0 < c < 0.4$, $0 \leq d \leq 0.02$, and $a+b+c+d=1$, M2 is selected from at least one of Mn or Al, and N2 is selected from at least one of Mg, Ti, Zr, Nb, Y, Cr, V, Ge, Mo or Sr, a surface of the second lithium-containing transition metal oxide further comprises a boron element, and based on the total molar amount of the transition metal elements in the second lithium-containing transition metal oxide, a molar percentage of the boron element is 0.1% to 0.5%.

* * * * *